United States Patent
Ogura et al.

(10) Patent No.: US 7,215,702 B2
(45) Date of Patent: May 8, 2007

(54) SIGNAL LEVEL DETECTION APPARATUS AND DETECTION METHOD, AND SIGNAL LEVEL INDICATION APPARATUS

(75) Inventors: Yasuhiro Ogura, Kanagawa (JP); Tadao Suzuki, Tokyo (JP)

(73) Assignee: Sony Corporation (JP)

( * ) Notice: Subject to any disclaimer, the term of this patent is extended or adjusted under 35 U.S.C. 154(b) by 802 days.

(21) Appl. No.: 10/362,317

(22) PCT Filed: Jun. 26, 2002

(86) PCT No.: PCT/JP02/06429

§ 371 (c)(1),
(2), (4) Date: Feb. 20, 2003

(87) PCT Pub. No.: WO03/003372

PCT Pub. Date: Jan. 9, 2003

(65) Prior Publication Data
US 2003/0174787 A1 Sep. 18, 2003

(30) Foreign Application Priority Data
Jun. 27, 2001 (JP) ............................. 2001-195189

(51) Int. Cl.
*H04B 3/46* (2006.01)
*H04B 17/00* (2006.01)
*H04Q 1/20* (2006.01)

(52) U.S. Cl. ....................................................... 375/224
(58) Field of Classification Search ................ 375/224, 375/247, 360, 369; 341/63, 77, 106
See application file for complete search history.

(56) References Cited

U.S. PATENT DOCUMENTS

| | | | | |
|---|---|---|---|---|
| 4,020,286 A | * | 4/1977 | Ceci | ............................ 704/226 |
| 5,493,212 A | * | 2/1996 | Gervais et al. | .............. 324/142 |
| 5,889,826 A | * | 3/1999 | Takahashi | .................... 375/347 |
| 6,411,230 B1 | * | 6/2002 | Tauchen et al. | ............ 341/101 |
| 6,535,845 B2 | * | 3/2003 | Van Der Vleuten et al. | ......................... 704/219 |

FOREIGN PATENT DOCUMENTS

| | | |
|---|---|---|
| JP | 57-185482 | 11/1982 |
| JP | 62-105593 | 5/1987 |

\* cited by examiner

*Primary Examiner*—Khai Tran
*Assistant Examiner*—Aslan Ettehadieh
(74) *Attorney, Agent, or Firm*—Lerner, David, Littenberg, Krumholz & Mentlik, LLP (57) ABSTRACT

A signal level detector to detect the level of 1-bit digital signal is provided. It includes a level detector (12) supplied with a sequence of 1-bit digital signals decoded by an audio decoder (5) and which counts the number of 0 (zeros) or 1 (ones) included in the row of a predetermined number n of 1-bit digital signals to detect the level of the 1-bit digital signal, and an indication unit (13) to indicate the signal level detected by the level detector (12).

8 Claims, 9 Drawing Sheets

| m | A (dB) |
|---|---|
| 28 | 6.02 |
| 27 | 5.38 |
| 26 | 4.68 |
| 25 | 3.93 |
| 24 | 3.10 |
| 23 | 2.18 |
| 22 | 1.16 |
| 21 | 0.00 |
| 20 | −1.34 |
| 19 | −2.92 |
| 18 | −4.86 |
| 17 | −7.36 |
| 16 | −10.88 |
| 15 | −16.90 |
| 14 | −∞ |
| 13 | −16.90 |
| 12 | −10.88 |
| 11 | −7.36 |
| 10 | −4.86 |
| 9 | −2.92 |
| 8 | −1.34 |
| 7 | 0.00 |
| 6 | 1.16 |
| 5 | 2.18 |
| 4 | 3.10 |
| 3 | 3.93 |
| 2 | 4.68 |
| 1 | 5.38 |
| 0 | 6.02 |

SIGNAL LEVEL DETECTION APPARATUS AND DETECTION METHOD, AND SIGNAL LEVEL INDICATION APPARATUS

TECHNICAL FIELD

The present invention generally relates to a signal level detecting apparatus and method, and more particularly to an apparatus for, and a method of, detecting the level of a 1-bit digital signal obtained by the delta-sigma modulation, and an apparatus for indicating the signal level detected by the signal level detector.

BACKGROUND ART

In the conventional compact disc (CD), the sampling frequency fs is about 44.1 kHz and the PCM method is used to record one sample as 16-bit digital audio data for each channel. There has been proposed a so-called super audio compact disc (SACD) in which a 1-bit audio stream data is recorded with a very high sampling frequency generated by the DSD (direct stream digital) method (for example, a frequency 64 times higher than the sampling frequency fs in the ordinary CD).

By oversampling delta-sigma modulation of an input signal with 64 fs, there is generated a 1-bit audio digital signal. Hereupon, the 1-bit audio digital signal is decimated into a multi-bit PCM code in the CD using the PCM method. In the SACD using the DSD method, however, the 1-bit audio digital signal is recorded directly to the SACD.

The frequency band of the 1-bit audio signal recorded to the SACD is about 100 kHz. This is rather wider than the frequency band of the signal in the PCM method adopted in the CD.

In playback of the SACD having recorded therein the same audio signal in such a wide frequency band as in the CD, sound components of relatively low frequencies can be reproduced to be audible to the human ears. For example, even when the SACD is played back in a player having no ample acoustic-pressure frequency response, such as a home audio player, the sound recorded in the SACD can be reproduced to be audible to the human ears. However, the human ears can hardly hear sound components of high frequencies, such as 20 kHz or higher, reproduced from the SACD. When an audio signal in a wide band including high frequencies is reproduced from the SACD, sound components thereof in the low frequency band are audible to the human ears but sound components in the high frequency band are not audible to the human ears.

When reproducing an audio signal from a sound source including up to sound components of high frequencies such as about 100 kHz and which has an acoustic level of sound components in a high frequency band not audible to the human ears is higher than that of sound components in a low frequency band, raising the reproduction level of an audio player used for the audio signal reproduction, with the ability of the human ears taken in consideration, for the sound components in the low frequency band to be audible to the human ears at a sufficiently high acoustic pressure level, will result in an elevated acoustic pressure level of the sound components in the high frequency band for the high reproduction level. Since the human ears cannot hear any sound components in the high frequency; band, the reproduction level may possibly be raised above the capability of the audio player with the result that the power amplifier and speaker of the audio player is likely to be greatly loaded and damaged as the case may be.

Therefore, a function to monitor the sound level of sound components difficult to capture by the human ears should be provided in a player designed to reproduce audio signals in a wide band including from a low frequency to a high frequency such as 100 kHz, such as audio signals recorded to the SACD, or in an recorder to record such audio signals and an apparatus to produce a medium such as a compact disc or the like.

On the other hand, different from the multi-bit digital signal obtained by the conventional PCM method, the 1-bit digital signal obtained by the delta-sigma modulation includes also frequency components beyond the audio band of frequencies audible to the human ears. So, the level of the 1-bit digital signal cannot be known if left as it is. Conventionally, to know the level of a signal, only a necessary frequency component of the signal are extracted using a digital filter and the level of the signal is indicated based on the data thus extracted.

When the digital filter is used, however, different outputs may possibly result from the same input signal depending upon how the digital filter has been designed, namely, depending upon the type, factor and computing word length thereof. For example, since it is difficult to determine the level of the signal uniquely, indication of the same signal supplied to a player will possibly vary from one apparatus to another. Since the digital filter uses a multiplier and adder, its circuit is likely to be complicated and large in scale, which will cause a large manufacturing cost and increased power consumption of the circuit.

Also, if the digital filter is strictly designed for the completely same output from an input, it will be less flexible in performance and manufacturing cost so that the product design will be difficult in practice.

DISCLOSURE OF THE INVENTION

Accordingly, the present invention has an object to overcome the above-mentioned drawbacks of the related art by providing an apparatus for, and a method of, detecting the level of a 1-bit digital signal by a simple circuit construction.

The present invention has another object to provide a signal level indication apparatus for indicating the signal level detected by the signal level detector and capable of solving the conventional problem that the level indication of a 1-bit digital signal varies from one type the apparatus from another.

The above object can be attained by providing a signal level detector including according to the present invention:

a counting means sequentially supplied with 1-bit digital signals obtained by the delta-sigma modulation and which counts the number of zeros (0) or ones (1) in the 1-bit digital signal row including a predetermined number of 1-bit digital signals.

In the above signal level detector, the level of the 1-bit digital signal is detected based on the number of zeros (0) or ones (1) counted by the counting means.

Also the above object can be attained by providing a signal level detecting method including according to the present invention steps of:

sequentially receiving 1-bit digital signals obtained by the delta-sigma modulation and counting the number of zeros (0) or ones (1) in the 1-bit digital signal row including a predetermined number of 1-bit digital signals; and detecting the level of the 1-bit digital signal based on the number of zeros (0) or ones (1) counted in the counting step.

Also the above object can be attained by providing a signal level indication apparatus including according to the present invention:

a counting means sequentially supplied with 1-bit digital signals obtained by the delta-sigma modulation and which counts the number of zeros (0) or ones (1) in the 1-bit digital signal row including a predetermined number of 1-bit digital signals; and means for indicating the signal level detected based on the counting result supplied from the counting means.

These objects and other objects, features and advantages of the present invention will become more apparent from the following detailed description of the best mode for carrying out the present invention when taken in conjunction with the accompanying drawings.

BEST MODE FOR CARRYING OUT THE INVENTION

Some embodiments of the present invention will be described herebelow with reference to the accompanying drawings.

Figure 1:
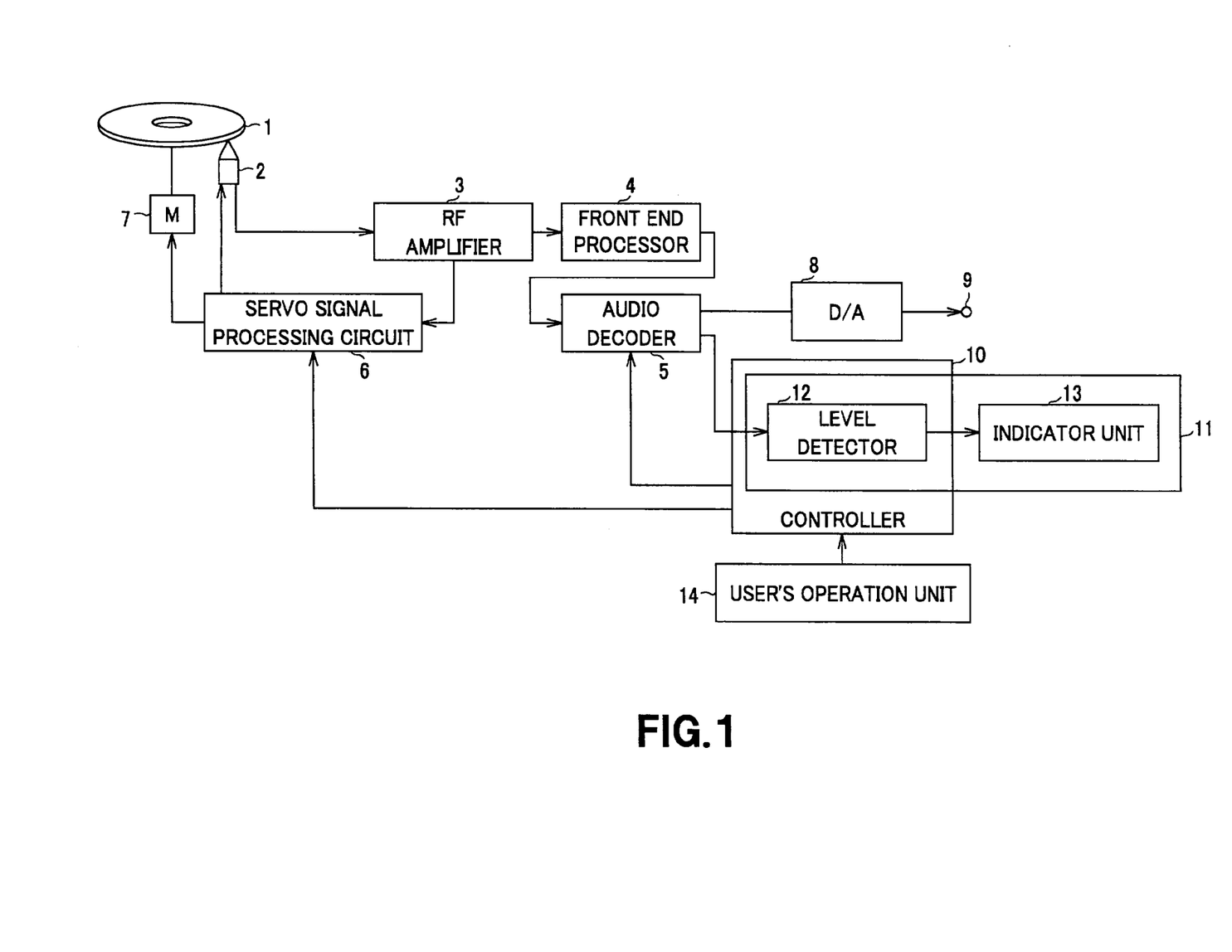
FIG. 1 is a block diagram of an optical disc player according to the present invention.

Referring now to FIG. 1, there is illustrated in the form of a block diagram an embodiment of the optical disc player according to the present invention, in which the level indication apparatus is provided.

For building up an optical disc player from a disc player compatible with a super audio compact disc (SACD) as a recording medium, or an optical disc playing system which uses a digital/analog (D/A) converter, amplifier, etc. along with the disc player, a level meter should desirably be provided which can monitor also sounds of high frequencies which cannot be captured by the human ears. To build up the disc player using the SACD or the optical disc playing system as a consumer apparatus, a level indication apparatus such as the level meter has to be provided to avoid that the disc player and disc plating system will be expensive.

To meet the above requirements, the optical disc player according to the present invention incorporates a level indication apparatus 11 as shown in FIG. 1. The level indication apparatus 11 indicates the level of a 1-bit audio signal reproduced from an SACD 1. The construction and function of the level indication apparatus 11 will be described in detail later.

Prior to explaining the optical disc player according to the present invention in detail, the SACD 1 as a recording medium played in the optical disc player will first be explained.

Figure 2:
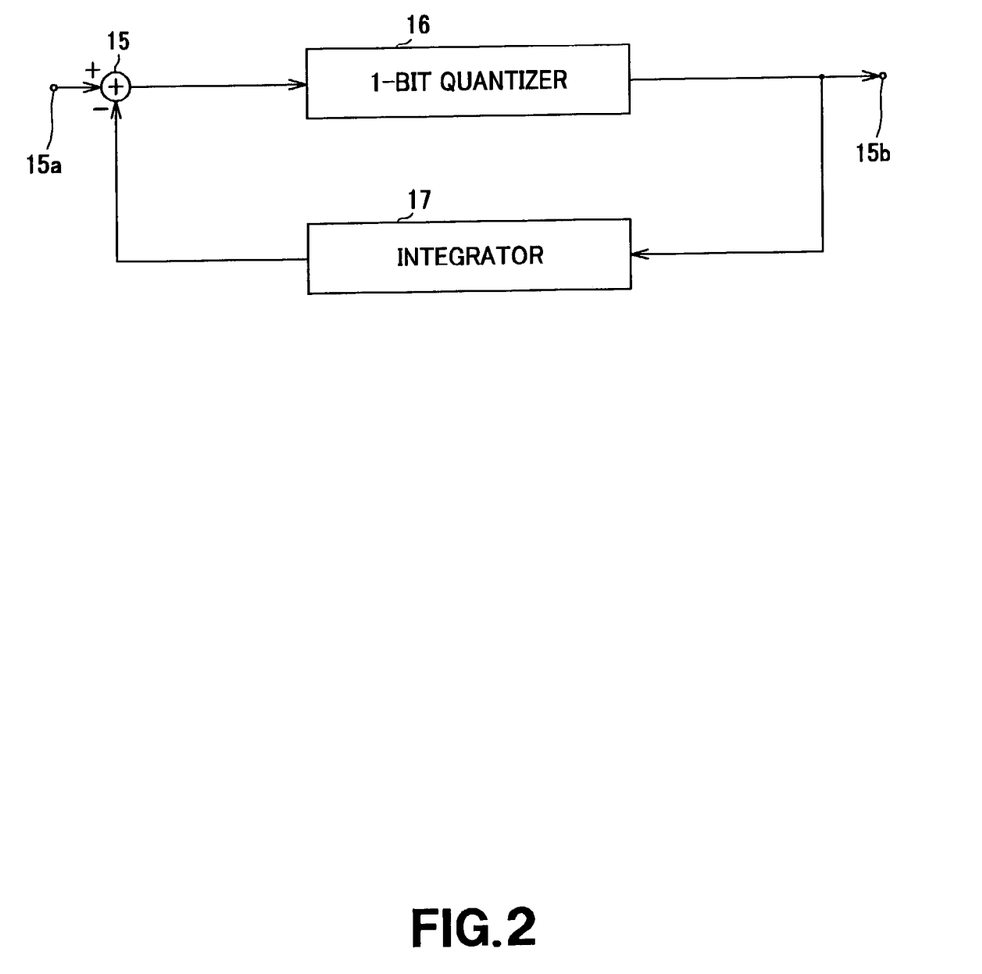
FIG. 2 is a block diagram of the delta-sigma modulator.

The SACD 1 has recorded directly therein the 1-bit audio signal obtained by the delta-sigma modulation of the audio signal from a sound source. FIG. 2 shows the delta-sigma modulator to generate the 1-bit audio signal. As shown, the delta-sigma modulator includes an adder 15, 1-bit quantizer 16 and an integrator 17. In the delta-sigma modulator, the adder 15 determines a difference (delta: $\Delta$) between an analog signal supplied via an input terminal 15a of the adder 15 and an integrated value (sigma: $\Sigma$) of a 1-bit output signal and supplies it to the 1-bit quantizer 16. The output signal consists of logical zeros (0) and logical ones (1) which represent −1 and +1, respectively, as actual values. The integrator 17 accumulates 1-bit output signals and outputs an accumulated value which follows up with the value of the analog input signal. Each time the 1-bit quantizer 16 generates one bit, it increase or decreases the accumulated value by one. The sampling frequency is so high as to generate a string of output bits whose accumulated value will follow up the analog input signal. The sampling frequency is 64 fs (64 times higher than fs (=44.1 kHz), for example. A 64 fs, 1-bit digital audio signal is provided at an output terminal 15b of the adder 15. The 64 fs, 1-bit digital audio signal output from the delta-sigma modulator is recorded to the SACD 1.

In the optical disc player shown in FIG. 1, the SACD 2 is rotated by a spindle motor 7 at a constant linear velocity (CLV), for example. The SACD 1 rotated by the spindle motor 7 is scanned over a signal recording area thereof by a read laser light emitted from a light source provided in an optical pickup 2 moved radially of the SACD 1. The laser light incident upon the SACD 1 and reflected from the latter is detected bu a light detector provided in the optical pickup 2 to read the 1-bit audio signal recorded on the SACD 1. The signal read by the optical pickup 2 is supplied to an RF amplifier 3. An RF signal output from the RF amplifier 3 is supplied to a front end processor 4 where it will undergo demodulation and error correction to generate sector data having a fixed length of 2064 bytes, for example. The sector data is supplied to an audio decoder 5 provided downstream of the front end processor 4.

The audio decoder 5 receives, from the front end processor 4, the sector data having the fixed length of 2064 bytes one by one, analyzes an audio header beginning from the top of each sector, and records the data to each block of an internal or external memory in units of 1/75-sec frame.

The data recorded in units of frame in each block of the internal or external memory is supplied to a compression decoder (not shown), provided in the audio decoder 5, where it will be decoded. The decoded data is faded as necessary in a fader, converted by a D/A converter 8 into an analog audio signal and then supplied from an output terminal 9 to an external amplifier, speaker, etc. The audio decoder 5 supplies the decoded 1-bit audio signal to the level indication apparatus 11 as well.

The RF amplifier 3 generates also a tracking error signal and focus error signal from the read signal detected by the optical pickup 2 and supplies these signals to a servo signal processing circuit 6. Based on the tracking and focus error signals supplied from the RF amplifier 3, the servo signal processing circuit 6 moves an objective lens which gathers and directs the reading laser light emitted from the optical pickup 2 upon the signal recording surface of the SACD 1. As drive currents corresponding to the focus and tracking error signals, respectively, are supplied to an objective lens driving mechanism such as an actuator holding the objective lens and the like, the objective lens is moved in a focusing direction parallel to the optical axis thereof and in a tracking direction orthogonal to the optical axis. As the objective lens is thus moved based on the focus and tracking error signals, the reading laser light emitted from the light source in the optical pickup 2 is focused onto the signal recording surface of the SACD 1 and controlled to follow up a recording track formed on the SACD 1. Also, the servo signal processing circuit 6 controls the spindle motor 7 to rotate.

The audio decoder 5, servo signal processing circuit 6, etc. operate under the control of a controller 10. The controller 10 has a user's operation unit 14 connected thereto. The controller 10 includes a level detector 12 which will be described in detail later.

The level indication apparatus 11 includes the level detector 12 to detect the level of a 1-bit digital signal supplied from the audio decoder 5, and an indicator unit 13 to indicate the signal level detected by the level detector 12.

The level detector 12 is supplied with a sequence of 1-bit digital signals read from the SACD 1, and counts the number of zeros (0) or ones (1) included in a 1-bit digital signal row consisting of a number n of 1-bit digital signals to detect the level of the 1-bit digital signal.

Figure 3:
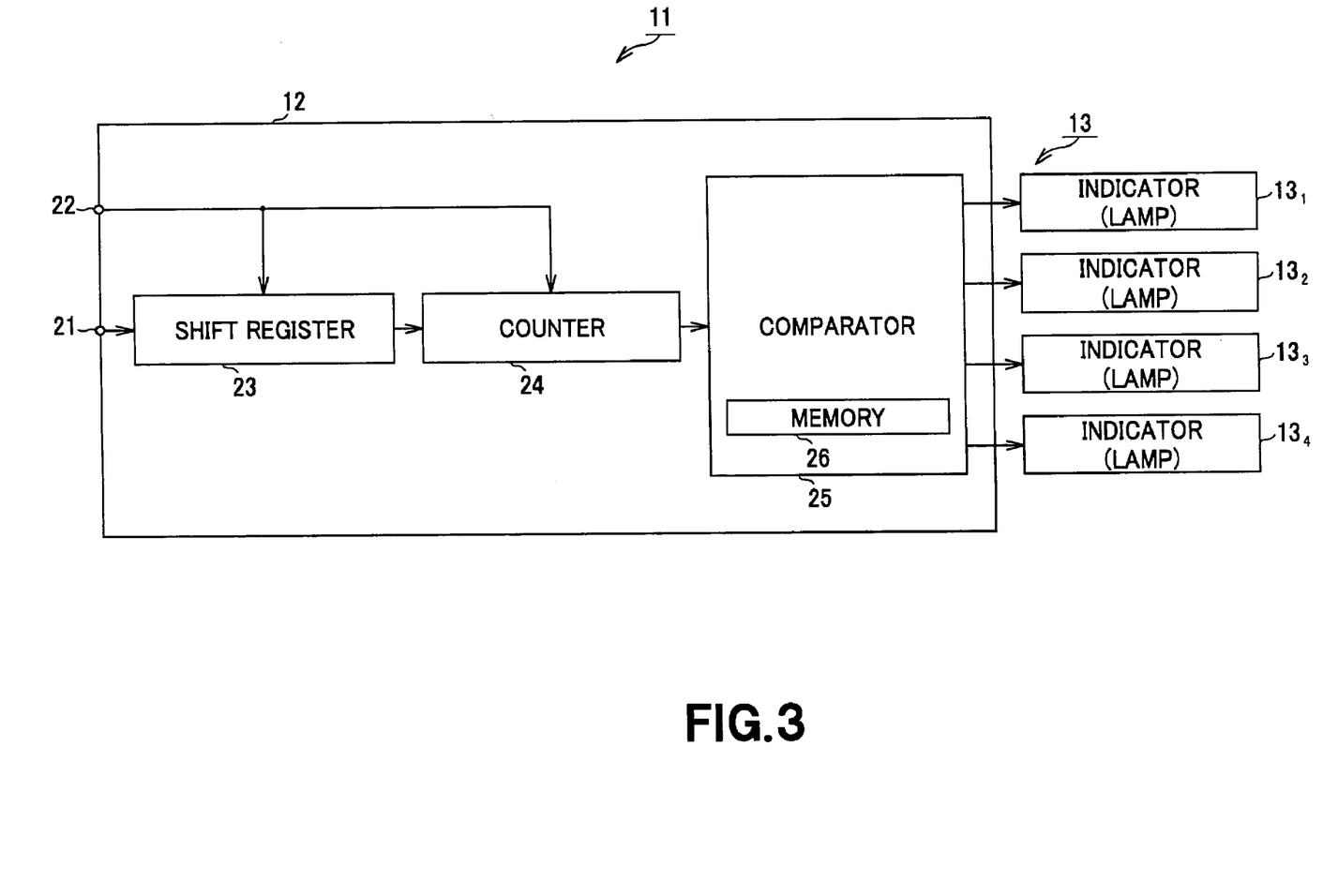
FIG. 3 is a block diagram of the level indication apparatus incorporated in the optical disc player according to the present invention.

FIG. 3 shows in detail the construction of the level indication apparatus 11 including the level detector 12 and indicator unit 13.

The level detector 12 includes a shift register 23 to store the 1-bit digital signal row, counter 24 to count zeros (0) and ones (1) in the 1-bit digital signal row, and a comparator 25 to compare the result of counting supplied from the counter 24 with a built-in conversion table. The indicator unit 13 includes four indicators $13_1$, $13_2$, $13_3$ and $13_4$, for example, which turn on correspondingly to the result of comparison supplied from the comparator 25. The shift register 23 shifts the 1-bit audio signal supplied from the audio decoder 5 via an input terminal 21 to store a 1-bit digital signal row including a predetermined number n of 1-bit digital signals. The counter 24 counts the number of zeros (0) and ones (1) included in the 1-bit digital signal row stored in the shift register 23. The comparator 25 compares the result of counting supplied from the counter 24 with values in the conversion table stored in a memory 26 which will be described later to provide a level A (dB) for determining which one of the indicators included in the indicator unit 13 turns on.

The level indication apparatus 11 constructed as above functions as will be described below:

First, the shift register 23 and counter 24 are reset by a reset signal supplied from the controller 10 via a terminal 22. After the reset signal is cleared, the counter 24 monitors the output of the shift register 23 each time a 1-bit audio signal is supplied from the input terminal 21 to count how many zeros (0) and ones (1) are in the shift register 23.

The data counted by the counter 24 is sent to the comparator 25 which will locate a value of the level A (dB) based on the data and referring to the conversion table in the memory 26 to thereby determine which one of the indicators is to be turned on.

The level detector 12 functions as will be discussed below:

The more positive the analog input waveform goes, the more times the 1-bit digital signal generated by the delta-sigma modulator is outputted as one (1). On the other hand, the more negative the analog input waveform goes, the more times the 1-bit digital signal is outputted as zero (0). At the zero point, zeros (0) and ones (1) are outputted almost alternately, namely, the zeros (0) and ones (1) are outputted the same times. Thus, the variation in amplitude of the analog input waveform is represented by densities of the ones and zeros, respectively, like a pulse density.

Therefore, a row of data in which the same numbers of ones (1) and zeros (0) are listed, such as "010101010101010101010101010101", is "0" in the PCM method. Similarly, a row of data including more ones (1) than zeros (0) indicates a positive signal level, while a row of data including more zeros (0) than ones (1) indicates a negative signal level.

Further, a row of data all being "1" indicates a largest positive signal level, while a row of data all being "0" indicates a largest negative signal level.

Assume here that a sequence of n data includes a number m of ones (1). The modulation factor η for this signal is represented by:

$$\eta = |2m - n|/n$$

When m=n or m=0, for example, the modulation factor η is 100%. When m=(¾)n or (¼)n, the modulation factor η is 50%. When m=n/2, the modulation factor η is 0%.

Since the sound level is considered to be proportional to the modulation factor η, the sound level A is represented as follows on the assumption that the modulation factor η of 50% corresponds to 0 dB:

$$\text{Level } A(\text{dB}) = 20 \log \{|2(2m-n)|/n\}$$

Figure 4:
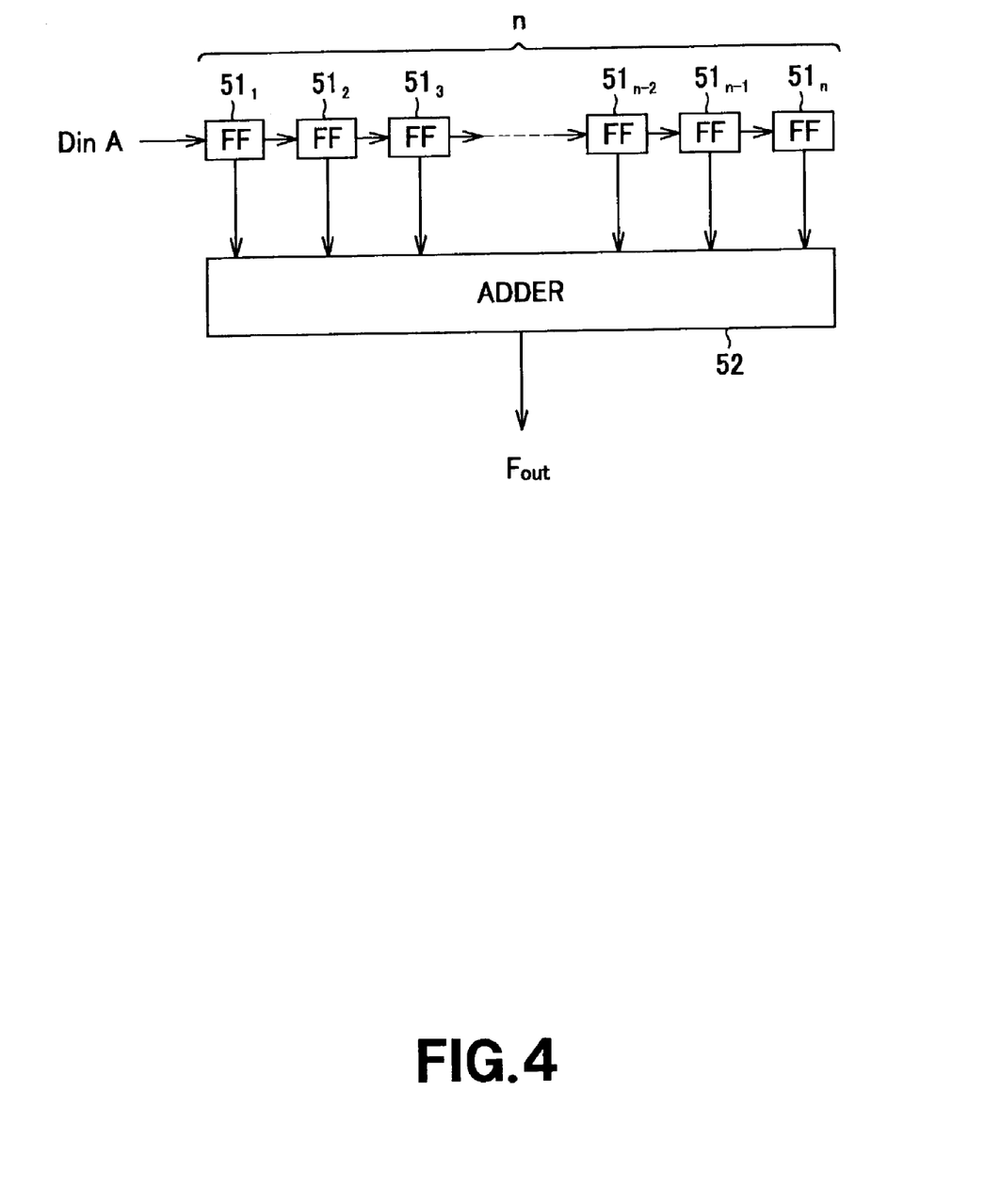
FIG. 4 is a block diagram of the moving average filter.

Note that to count the number of ones (1) included in a data row having a length n as above is to use one moving average filter stage having the length n as shown in FIG. 4. The moving average filter includes a number n of flip-flops FF $51_1$, $51_2$, $51_3$, ..., $51_{n-2}$, $51_{n-1}$ and $51_n$ to shift a data input Din A, and an adder 52 to add together outputs from the number n of FFs to provide a moving average filter output Fout.

Figure 5:
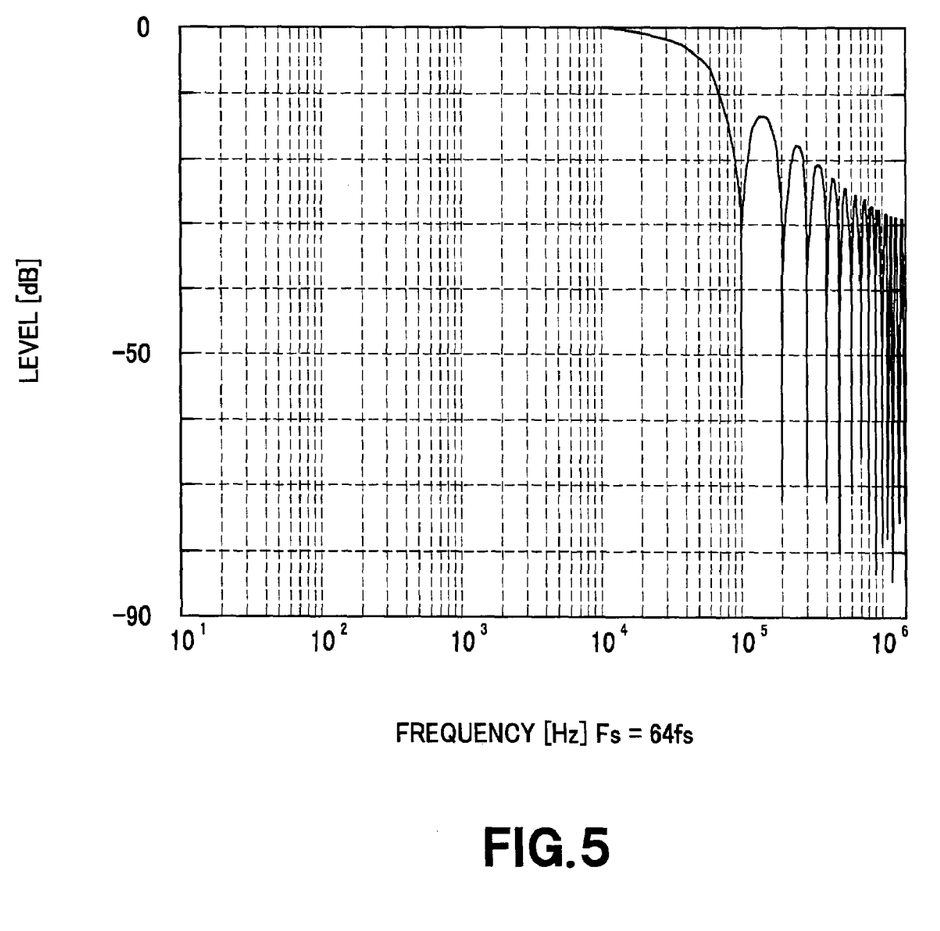
FIG. 5 shows the frequency response of the moving average filter.

Note that when the sampling period of the data row is 44.1 kHz×64=2.8244 MHz used in the super audio CD (SACD) and the filter length n=28, the frequency response of the moving average filter is as shown in FIG. 5. That is, the moving average filter shown in FIG. 4 is to lower the signal level by about 3 dB at a frequency of about 50 kHz, namely, a filter for about 100 kHz. Namely, by counting the number of zeros (0) or ones (1) included in a sequence of 28 data, it is possible to simply examine the signal level at the frequency of about 100 kHz.

Figure 6:
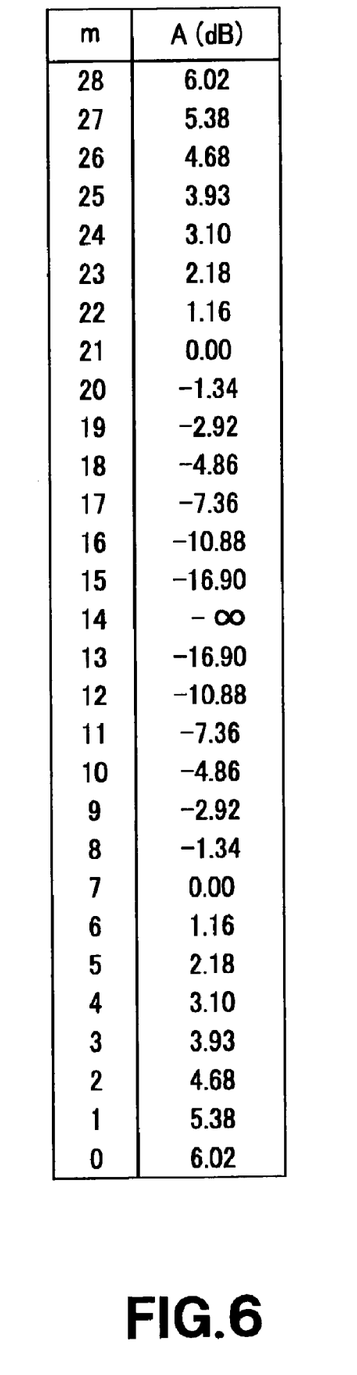
FIG. 6 shows the number m of ones (1) in a sequence of n data (n=28) and the signal level A of the data.

FIG. 6 shows the relation between a number m of ones (1) when the number of data in a sequence is n=28 and the signal level value A, namely, the content of the conversion table. The signal level value A is a logarithmic value.

When the counter by the counter 24 in the level detector 12 shown in FIG. 3 is over 21 or under 7, the indicator $13_2$ in the indicator unit 13 is turned on. The indicator $13_2$ corresponds to +0 dB, which makes it possible to know that the input signal level is over +0 dB.

As having been described above, since the optical disc player for reproducing 1-bit digital signals obtained by the delta-sigma modulation uses a modulation factor for a signal to examine the level of the signal, the level indication apparatus 11 shown in FIG. 3 needs no multiplier and adder and thus can be designed simpler. Because of the simplified circuit, the level indication apparatus 11 can be manufactured with less costs and can operate with less power consumption. The level indication apparatus 11 according to the present invention may not be any dedicated circuit but may be formed from a CPU and its software. Thus, the construction itself can be designed not complicated. Further, since the accuracy of signal processing depends upon the CPU and its software, a signal level can be determined uniquely.

By providing the level indication apparatus 11 in the optical disc player according to the present invention, it can be avoided that when the same music is reproduced by a plurality of the optical disc players, the level of the music data is indicated varying from one player type to another. Also, by selecting an appropriate parameter for the modulation factor, it is possible to match the modulation factor with an intended frequency band.

Figure 7:
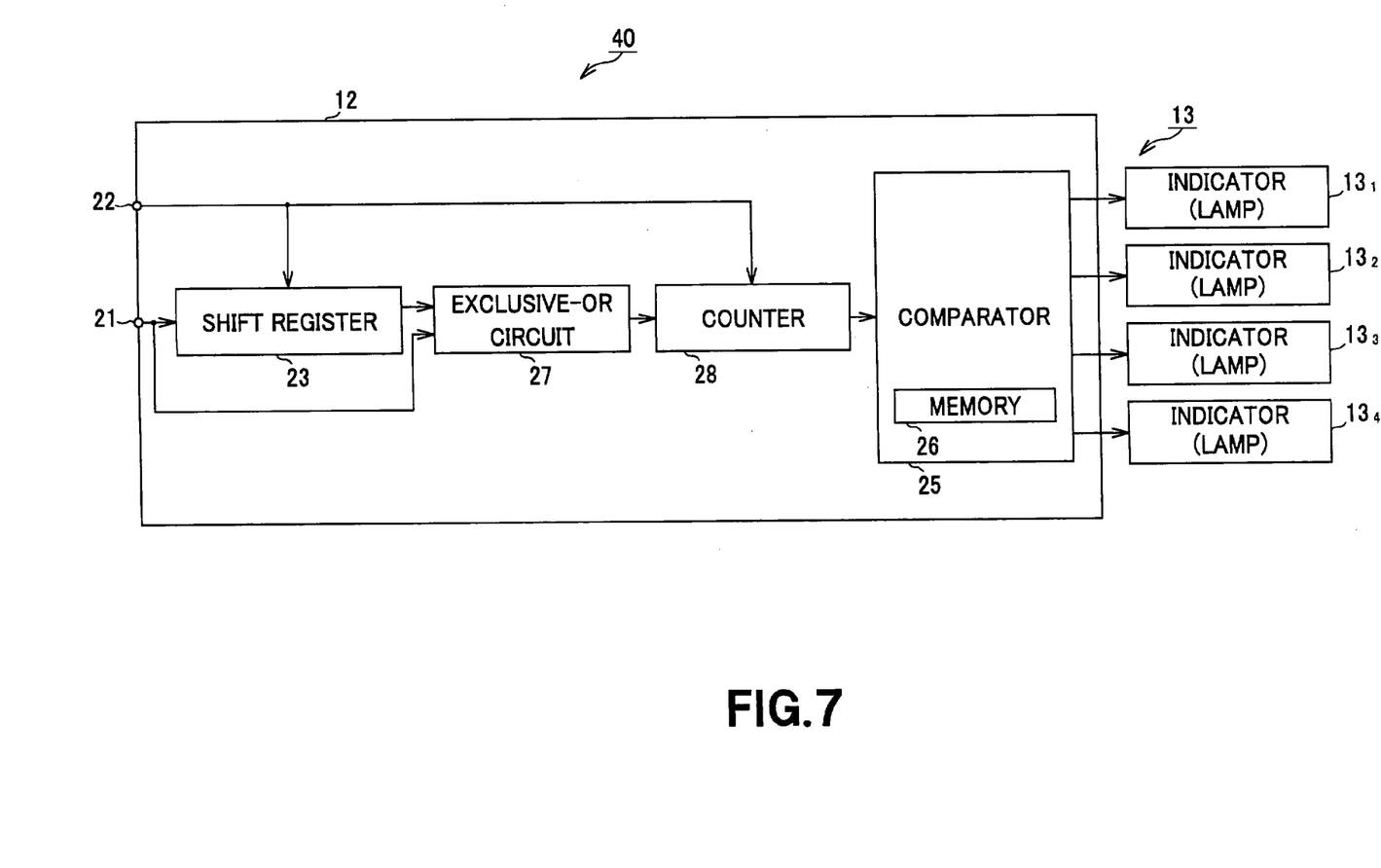
FIG. 7 is a block diagram of a variant of the level indication apparatus according to the present invention.

FIG. 7 shows in detail the construction of a variant of the level indication apparatus 11. The level indication apparatus is generally indicated with a reference 40.

In the level indication apparatus 40, the level detector 12 further includes an exclusive-OR circuit 27 and counter 28 provided between the shift register 23 and comparator 25. The exclusive-OR circuit 27 makes exclusive-OR of 1-bit digital signal supplied from the input terminal 21 and an output from the shift register 23. The counter 28 counts outputs from the exclusive-OR circuit 27.

The level indication apparatus 40 constructed as above functions as will be outlined below:

First, a reset signal supplied from the controller 10 is supplied to the shift register 23 and counter 28 via the terminal 22. The reset signal will reset the shift register 23 to "0101010101010101010101010101" which indicates zero (0) of the 1-bit digital audio signal. The counter 28 is set to the number of ones (1) in the 1-bit digital audio signal (14 in this case). After the reset signal is cleared, the exclusive-OR circuit 27 make exclusive-OR of 1-bit digital audio signal supplied from the input terminal 21 and output from the shift register 23. When the output from the exclusive-OR circuit 27 is zero (0), the supplied 1-bit digital signal and output from the shift register 23 are equal in value to each other, which means that in the shift register 23, the number of zeros (0) is equal to that of ones (1). In this case, the count in the counter 28 has not to be changed. When the output from the exclusive-OR circuit 27 is one (1), it is determined that the supplied 1-bit digital signal and output from the shift register 23 are different in value from each other. Thus, when the output from the shift register 23 is zero (0), the count in the counter 28 is increased by one. When the output is one (1), the count in the counter 28 is decreased by one. By examining the input to, and output from, the shift register in the above way, it is possible to know the numbers of zeros (0) and ones (1) without examining, at every time, the entire content of the shift register 23 as in the level detector 12 constructed as in FIG. 3.

In the optical disc player in which 1-bit digital signals obtained by the delta-sigma modulation are used, when the number of zeros (0) or ones (1) is known, the level indication apparatus 11 shown in FIG. 3 can detect the level of the signal with the use of a modulation factor for the signal and indicate it. That is, the aforementioned effect can be attained with the reduction of the amount of data processing.

Next, a second embodiment of the present invention will be described.

The second embodiment is an application of the present invention to an optical disc recorder incorporating the level indication apparatus according to the present invention.

At a site such as a recording studio, it is necessary to record signals while always monitoring the signal state. The signal-state monitoring is required because too high a level of a signal supplied to a recorder such as an optical disc recorder will possibly saturate the signal to be recorded, distort a sound to be recorded or damage the recorder in some cases. Reversely, when a signal supplied to the recorder is at too low a level, the signal will be recorded with a poor sound quality (with no dynamic range). Therefore, the recording level indication apparatus should be accurate since the recording level greatly affects the quality of the recording sound. That is, the level indication apparatus has to provide the same level indication for the same signal independently of the recording time, recording site and recorder type.

Figure 8:
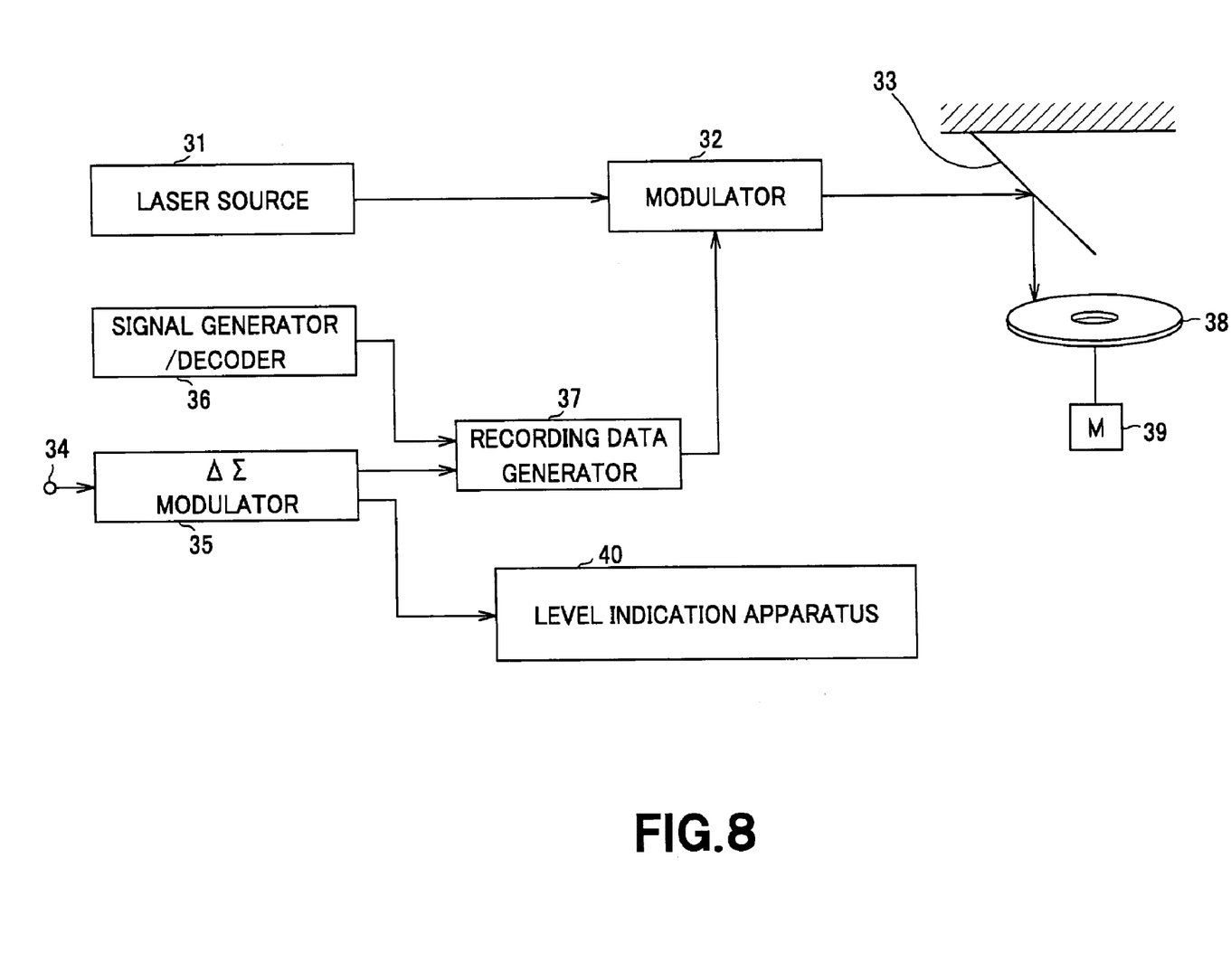
FIG. 8 is a block diagram of an optical disc recorder according to the present invention.

Referring now to FIG. 8, there is illustrated in the form of a block diagram an optical disc recorder according to the present invention. As shown, the optical disc recorder incorporates the level indication apparatus 40 to detect and indicate the output level of 1-bit digital audio signal to be recorded to the SACD.

The optical disc recorder includes a laser source 31 to emit recording laser light, light modulator 32 to modulate the laser light from the laser source 31 with recording data which will be described in detail later, sub code signal generator 36, delta-sigma modulator 35 to generate 1-bit digital audio signal, recording data generator 37 to generate recording data from the sub code signal and 1-bit audio signal, and a mirror 33 included in a feed mechanism to move the laser light modulated by the modulator 32 radially of an optical disc 38 rotated by a spindle moor 39.

The laser source 31 uses He—Ne gas laser, Ar gas laser or the like to generate the recording laser light. The recording laser light is supplied to the light modulator 32 where it will be modulated.

The light modulator 32 is an EOM (electro-optical modulator) whose index of refraction varies depending upon a voltage applied thereto. It should be noted that an AOM (acousto-optical modulator) of such a type as to generate ultrasounds (compression wave) in a medium by a piezoelectric element may be used instead of the EOM.

The sib code signal generator 36 generates sub code signal such as content data or the like and supplies it to the recording data generator 37. The recording data generator 37 receives also 1-bit digital audio signal from the delta-sigma modulator 35.

As will be seen from FIG. 7, the level indication apparatus 40 used in the optical disc recorder as the second embodiment of the present invention is constructed similarly to the level indication apparatus 11 shown in FIG. 3. Namely, it includes a level detector and indicator unit. The level indication apparatus 40 includes the level detector 12 constructed as shown in FIG. 7. Since signal level is examined using a signal modulation factor supplied from the level detector 12, no multiplier and adder are required, which leads to a simplified circuit configuration. The level indication apparatus 40 according to the present invention is thus simple in circuit configuration, and so it can be manufactured with less costs and consumes less power. Also, the level indication apparatus 40 may not be any dedicated circuit but may be formed from a CPU and its software. Thus, the construction itself will not be complicated, and since the accuracy of signal processing depends upon the software, a signal level can be determined uniquely.

By providing the aforementioned level indication apparatus 40 in the optical disc recorder according to the present invention, it can be avoided that when the same music is recorded by a plurality of the optical disc recorders, the level of the music data is indicated varying from one recorder type to another. Also, by selecting an appropriate parameter for the modulation factor, it is possible to match the modulation factor with an intended frequency band.

Next, a third embodiment of the present invention will be described.

The third embodiment is an application of the present invention to an optical disc editing apparatus incorporating the level indication apparatus according to the present invention.

Also in an editing apparatus for producing a medium from which signals included in a wide frequency band can be reproduced using sound data recorded by the recorder as in the recording to the SACD, the signals should undergo editions such as sound level adjustment, equalization, dynamic ranging and the like. So, unless the sound level after edited is monitored, the level of signals inscribed to a disc will be higher, which may possibly damage the player which plays back the disc. Since a delicate level adjustment is effected in the sound playback, the level meter should be accurate.

Figure 9:
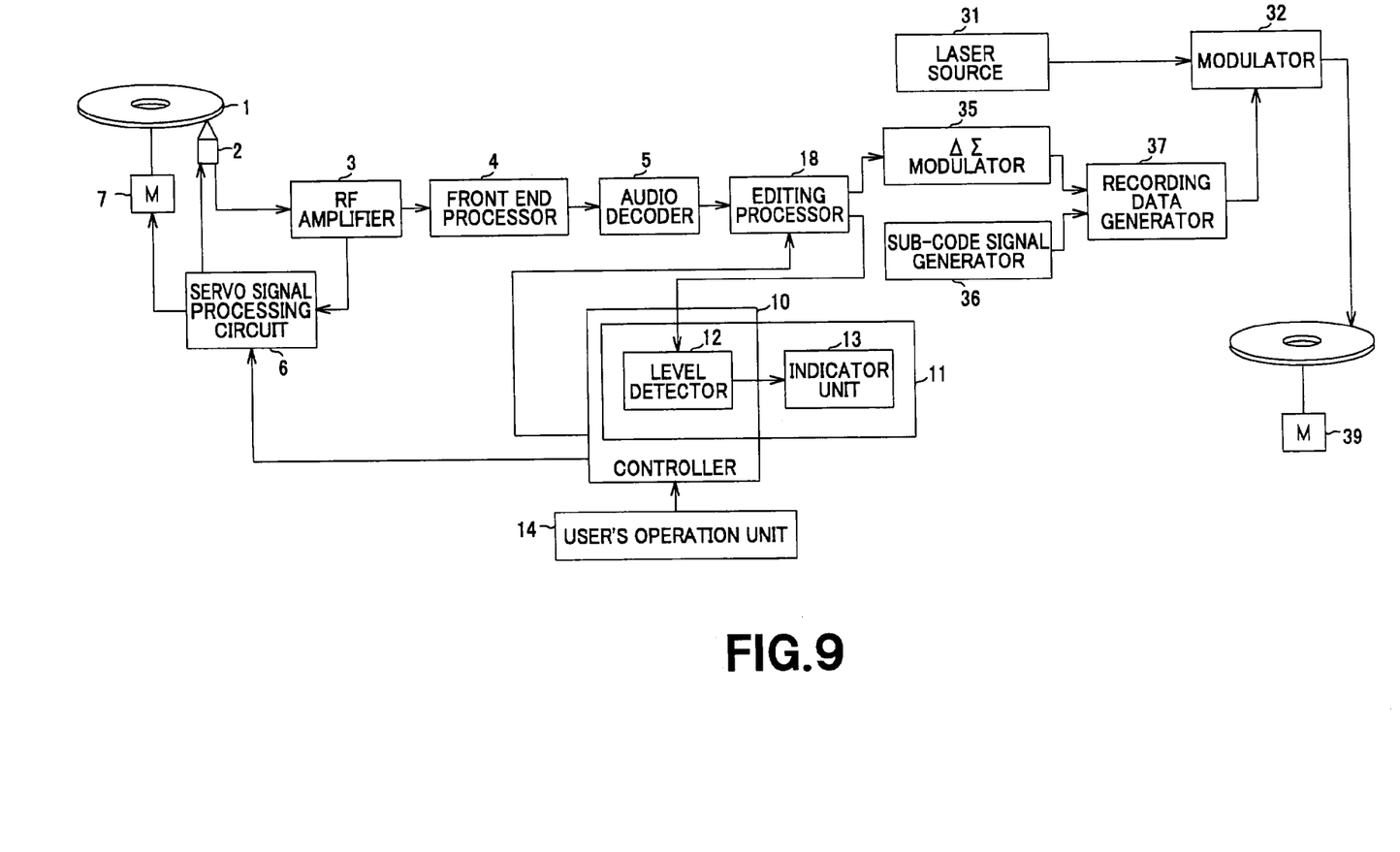
FIG. 9 is a block diagram of an optical disc editing apparatus according to the present invention.

To meet the above requirements, the optical disc editing apparatus according to the present invention is constructed as shown in FIG. 9. In the optical disc editing apparatus shown in FIG. 9, audio data recorded in the SACD is reproduced and the output level of edited 1-bit digital signal is detected and displayed by the built-in level indication apparatus 11.

The optical disc editing apparatus according to the present invention is a combination of the optical disc player shown in FIG. 1, from which the D/A converter 8 is omitted and in which an editing processor 18 is additionally provided instead of the D/A converter 8 downstream of the audio decoder 5 and the optical disc recorder shown in FIG. 8, of which the delta-sigma modulator 35 is connected to the editing processor 18.

In the level indication apparatus 11, the level of 1-bit digital signal generated by the delta-sigma modulator 35 is detected by the level detector 12, and the signal level detected by the level detector 12 is indicated in the indicator unit 13. More specifically, the level detector 12 is supplied with a sequence of 1-bit digital signals from the delta-sigma modulator 35 and counts the number of zeros (0) or ones (1) included in the row of a predetermined number n of 1-bit digital signals to detect the level of the 1-bit digital signal.

Note that the delta-sigma modulator 35 generates 1-bit digital signal by the delta-signal modulation of a multi-bit digital signal output from the editing processor 18.

The editing processor 18 makes editions such as sound level adjustment, equalization, dynamic ranging and the like of 1-bit-digital signal decoded by the audio decoder 5 correspondingly to operations of a user's operation unit 14 by the user. The output from the editing processor 18 is a multi-bit digital signal. This digital signal is converted again by the delta-sigma modulator 35 into 1-bit digital signal.

At this time, the level detector 12 in the level indication apparatus 11 detects the level of the 1-bit digital signal thus edited, and indicates it. Thus, the user can monitor the level of a signal inscribed to the disc, and protect the player which plays the medium therein against the aforementioned damage.

Since the level detector constructed as shown in FIG. 3 or 7 examines the level of a signal with the use of a modulation factor for the signal, the level indication apparatus 11 does not require any multiplier and adder, which will lead to a simple circuit configuration. Because of such a simplified circuit configuration, the apparatus can be manufactured with less costs and consumes less power. Also, by using the signal level detecting method according to the present invention, the level indication apparatus 11 may not be any dedicated circuit but may be formed from a CPU and its software. Thus, the construction itself will not be complicated, and since the accuracy of signal processing depends upon the software, a signal level can be determined uniquely.

By providing the aforementioned level indication apparatus 11 in the optical disc editing apparatus according to the present invention, it can be avoided that when the same music is recorded to a plurality of optical discs, the level of the music data is indicated varying from one disc type to another. Also, by selecting an appropriate parameter for the modulation, it is possible to match the modulation factor with an intended frequency band.

In each of the aforementioned embodiments of the present invention, the signal level detector detects, by the level detector, the level of 1-bit digital signal for the purpose of informing the user of the level of a signal to be reproduced or recorded, and indicates it in the indicator unit. The signal level detector according to the present invention may be designed such that the level detector will always monitor the reproduction level of the audio player and automatically reduce the Output when a signal whose level is higher than a predetermine one is supplied in order to protect the amplifier and speaker.

The signal level detector according to the present invention is also usable to check the level of electronically filed sound data. Recently, sound data is recorded, reproduced and edited as computer data file in many cases. To check the level of sound in such a sound file, the signal level detecting method according to the present invention needs neither any complicated signal processing nor special hardware and thus can be used to check, only by the CPU and its software, the level of sound data as an electronic file to see whether any abnormally high-level sound is included in the file without having to reproduce the sound data once.

INDUSTRIAL APPLICABILITY

As having been described in the foregoing, the signal level detecting apparatus and method according to the present invention can detect the level of 1-bit digital signal by a simple, smaller-scale circuit configuration.

Also, the signal level indication apparatus according to the present invention permits, when applied in a player, recorder and editing apparatus, to avoid that the signal level indication varies from one apparatus type to another.

The invention claimed is:

1. A signal level detector comprising:
    a counter for counting an occupation ratio, the occupation ratio being a ratio of a number of zeros (0) to a number of ones (1) in a 1-bit digital signal row, wherein the counter is sequentially supplied with 1-bit digital signals obtained by delta-sigma modulation, and wherein the digital signal row includes a predetermined number of the 1-bit digital signals; and
    an indicator unit for indicating a signal level based on the occupation ratio supplied from the counter.

2. The apparatus as set forth in claim 1, further comprising a conversion table for converting the occupation ratio to the signal level.

3. The apparatus as set forth in claim 2, wherein the conversion table has stored pairs of the signal level logarithmically represented and the occupation ratio.

4. A signal level detecting method comprising the steps of:
    sequentially receiving 1-bit digital signal obtained by delta-sigma modulation;
    counting an occupation ratio, the occupation ratio being a ratio of a number of zeros (0) to a number of ones (1)

in a 1-bit digital signal row including a predetermined number of the 1-bit digital signals; and detecting a level of the 1-bit digital signal based on the occupation ratio.

5. The method as set forth in claim 4, wherein in the step of detecting a level, the signal level is detected by referring to a conversion table having stored therein the signal level logarithmically represented and the occupation ratio.

6. A signal level indication apparatus comprising:

counting means for counting an occupation ratio, the occupation ratio being a ratio of a number of zeros (0) to a number of ones (1) in a 1-bit digital signal row, wherein the counting means is sequentially supplied with 1 bit digital signals obtained by delta-sigma modulation, and wherein the digital signal row includes a predetermined number of the 1-bit digital signals; and means for indicating a signal level detected based on the occupation ratio supplied from the counting means.

7. The apparatus as set forth in claim 6, further comprising conversion means for converting the occupation ratio to the signal level.

8. The apparatus as set forth in claim 7, wherein the conversion means has stored pairs of the signal level logarithmically represented and the occupation ratio.

* * * * *

UNITED STATES PATENT AND TRADEMARK OFFICE
CERTIFICATE OF CORRECTION

PATENT NO. : 7,215,702 B2  Page 1 of 1
APPLICATION NO. : 10/362317
DATED : May 8, 2007
INVENTOR(S) : Yasuhiro Ogura and Tadao Suzuki It is certified that error appears in the above-identified patent and that said Letters Patent is hereby corrected as shown below:

On the Title Page of the patent, in the Title item (54), in the first sentence, "DETECTION" should read --DETECTING--.

On the Title Page of the patent, in the Abstract item (57):

Column 1, line 1 "DETECTION" should read --DETECTING--;

Column 10, line 20 "Output" should read --output--;

Signed and Sealed this

Twentieth Day of May, 2008

JON W. DUDAS
*Director of the United States Patent and Trademark Office*